United States Patent
Galles et al.

(10) Patent No.: US 8,972,611 B2
(45) Date of Patent: Mar. 3, 2015

(54) MULTI-SERVER CONSOLIDATED INPUT/OUTPUT (IO) DEVICE

(75) Inventors: Michael B. Galles, Los Altos, CA (US); Subbarao Arumilli, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 812 days.

(21) Appl. No.: 13/207,807

(22) Filed: Aug. 11, 2011

(65) Prior Publication Data

US 2013/0042019 A1 Feb. 14, 2013

(51) Int. Cl.
 *G06F 15/16* (2006.01)
 *G06F 9/06* (2006.01)
 *H04L 29/00* (2006.01)
 *G06F 13/00* (2006.01)

(52) U.S. Cl.
 CPC . *G06F 9/06* (2013.01); *H04L 29/00* (2013.01)
 USPC .......................................... 709/250; 709/232

(58) Field of Classification Search
 CPC ....... H04L 129/00; H04L 49/00; H04L 49/30; H04L 29/00; H04L 45/566; H04L 45/00; H04L 12/4625; G06F 9/06; G06F 13/4022; G06F 13/385; G06F 13/102; G06F 13/404; G06F 2009/45579; G06F 2213/0026; G06F 9/45558; G06F 9/5077
 USPC .......... 709/250, 232, 220, 221, 222; 718/104; 710/313, 2, 3; 370/351
 See application file for complete search history.

(56) References Cited

U.S. PATENT DOCUMENTS

| | | | |
|---|---|---|---|
| 7,613,847 B2 * | 11/2009 | Kjos et al. ........................ 710/22 |
| 7,669,000 B2 * | 2/2010 | Sharma et al. ................. 710/310 |
| 7,916,628 B2 | 3/2011 | Ghosh et al. |
| 8,031,634 B1 * | 10/2011 | Artzi et al. ...................... 370/254 |
| 8,174,969 B1 * | 5/2012 | Kommidi et al. .............. 370/229 |
| 8,386,659 B2 * | 2/2013 | Jung et al. ........................ 710/10 |
| 8,503,468 B2 * | 8/2013 | Akyol et al. ................... 370/419 |
| 8,595,343 B2 * | 11/2013 | Cherian et al. ................. 709/223 |
| 8,706,938 B2 * | 4/2014 | Freking et al. ................. 710/113 |
| 8,776,050 B2 * | 7/2014 | Plouffe et al. ....................... 718/1 |
| 8,862,706 B2 * | 10/2014 | Wittenschlaeger ............ 709/221 |
| 2005/0038947 A1 * | 2/2005 | Lueck et al. ................... 710/315 |
| 2006/0212751 A1 * | 9/2006 | Yamamoto et al. ............... 714/6 |
| 2007/0112996 A1 * | 5/2007 | Manula et al. ................. 710/310 |
| 2007/0266179 A1 * | 11/2007 | Chavan et al. ................. 709/250 |
| 2008/0052431 A1 * | 2/2008 | Freking et al. ................. 710/104 |

(Continued)

OTHER PUBLICATIONS

"Multi-Root I/O Virtualization and Sharing Specification Revision 1.0", PCI-SIG®, www.pcisig.com, May 12, 2008, 260 pages.

(Continued)

*Primary Examiner* — Alina N Boutah
(74) *Attorney, Agent, or Firm* — Edell, Shapiro & Finnan, LLC (57) ABSTRACT

An input/output (IO) device for connecting multiple servers to one or more network interfaces. The device includes a network connection module comprising one or more network interfaces, and a virtual host interface configured to enable communication with a plurality of host servers. The device includes IO controller configured to connect each of the host servers to one or more of the network interfaces such that the connections between each host server and corresponding one or more network interfaces are operationally isolated and independent from one another.

21 Claims, 5 Drawing Sheets

(56) References Cited

U.S. PATENT DOCUMENTS

| | | | |
|---|---|---|---|
| 2008/0147959 A1* | 6/2008 | Freimuth et al. | 711/100 |
| 2008/0263246 A1* | 10/2008 | Larson et al. | 710/107 |
| 2009/0003361 A1* | 1/2009 | Bakthavathsalam | 370/401 |
| 2009/0010279 A1* | 1/2009 | Tsang et al. | 370/468 |
| 2009/0077297 A1* | 3/2009 | Zhao et al. | 710/314 |
| 2009/0204736 A1* | 8/2009 | Xie et al. | 710/104 |
| 2009/0216910 A1* | 8/2009 | Duchesneau | 709/250 |
| 2009/0304002 A1* | 12/2009 | Yu et al. | 370/395.3 |
| 2010/0088431 A1* | 4/2010 | Oshins et al. | 710/10 |
| 2010/0165874 A1* | 7/2010 | Brown et al. | 370/254 |
| 2010/0183028 A1* | 7/2010 | Howard et al. | 370/468 |
| 2010/0275199 A1 | 10/2010 | Smith et al. | |
| 2011/0078381 A1* | 3/2011 | Heinrich et al. | 711/122 |
| 2011/0099319 A1 | 4/2011 | Mukherjee et al. | |
| 2011/0106981 A1* | 5/2011 | Watkins et al. | 710/9 |
| 2011/0116513 A1* | 5/2011 | Gilson | 370/469 |
| 2011/0128970 A1 | 6/2011 | Breton et al. | |
| 2011/0179317 A1* | 7/2011 | Yamamoto et al. | 714/54 |
| 2011/0219164 A1* | 9/2011 | Suzuki et al. | 710/316 |
| 2011/0258641 A1* | 10/2011 | Armstrong et al. | 719/327 |
| 2011/0264840 A1* | 10/2011 | Loffink | 710/315 |
| 2012/0166690 A1* | 6/2012 | Regula | 710/104 |
| 2012/0233607 A1* | 9/2012 | Kuroda et al. | 718/1 |
| 2012/0260015 A1* | 10/2012 | Gay et al. | 710/301 |
| 2012/0265910 A1* | 10/2012 | Galles et al. | 710/300 |
| 2013/0117469 A1* | 5/2013 | Corrigan et al. | 709/249 |
| 2013/0339558 A1* | 12/2013 | Zhu et al. | 710/105 |
| 2014/0006679 A1* | 1/2014 | Eguchi et al. | 710/316 |
| 2014/0019794 A1* | 1/2014 | Chandhoke et al. | 713/502 |

OTHER PUBLICATIONS

"NextIO: vConnect Overview", Aug. 10, 2011, http://www.nextio.com/show.php?page=products_overview&phpMyAdmin=Hs4JByK%2 . . . , 1 page.

* cited by examiner

MULTI-SERVER CONSOLIDATED INPUT/OUTPUT (IO) DEVICE

TECHNICAL FIELD

The present disclosure relates to an input/output (IO) device that connects multiple servers to one or more network interfaces.

BACKGROUND

In an enterprise computing environment, host servers running one or more processes communicate with other devices in a network via individual input/output (IO) devices. In one example, the host servers connect to the IO devices in accordance with a computer expansion card standard, such as the Peripheral Component Interconnect Express (PCIe) standard.

Enterprise computing environments continue to grow in scale, complexity and connectivity. Virtualization technologies have been used in a number of manners to address such issues, but have not been fully exploited for use in IO devices.

DESCRIPTION OF EXAMPLE EMBODIMENTS

Overview

An IO device is provided for connecting multiple servers to one or more network interfaces. The IO device includes a network connection module that comprises a plurality of network interfaces, and a virtual host interface configured to communicate with a plurality of host servers. The IO device also includes an input/output (IO) controller configured to connect each of the host servers to one or more of the network interfaces such that the connections between each host server and corresponding one or more network interfaces are operationally isolated and independent from one another.

Example Embodiments

Figure 1:
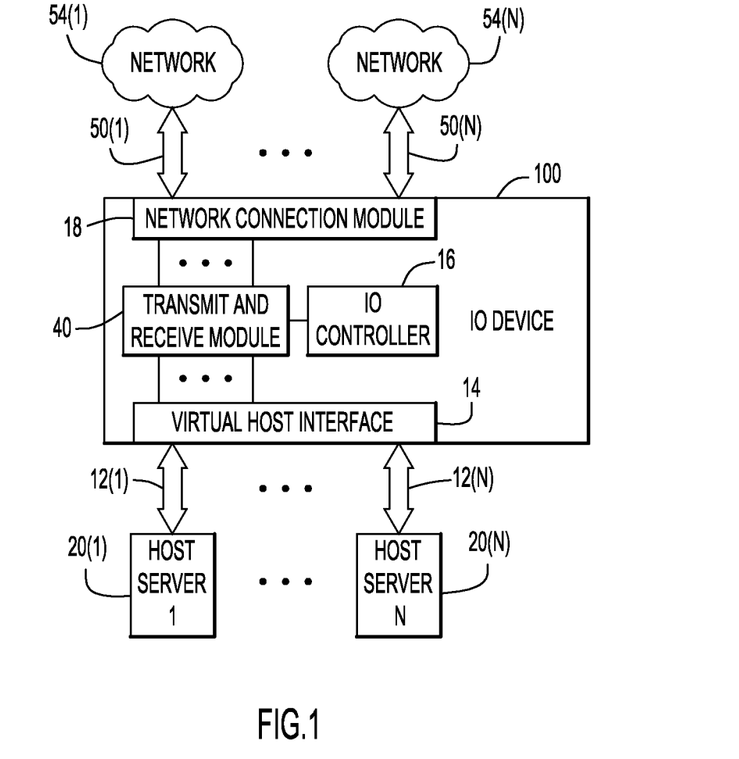
FIG. 1 is a block diagram of an IO device configured to connect multiple servers to one or more network interfaces.

FIG. 1 is a high-level block diagram of an IO device 100 configured for multi-server consolidation according to the techniques described herein. IO device 100 includes a virtual host interface 14 that is configured to enable communication with a plurality of host servers 20(1)-20(N). As detailed below, virtual host interface 14 enables a number (N) of independent communication links 12.

IO device 100 also comprises a network connection module 18 that includes a plurality of network interfaces (not shown in FIG. 1). The network interfaces are configured to enable a plurality of network connections or uplinks 50(1)-50(N) with one or more networks 54(1)-54(N) (e.g., local area networks, wide area networks, etc.) or to provide multiple connections to the same network via links 50(1)-50(N).

IO device 100 also includes an IO controller 16 that is configured to connect each of the host servers 20(1)-20(N) to one or more of the network interfaces in network connection module 18. These connections are provided via virtual host interface 14 and transmit and receive module 40. In one form, IO device 100 is implemented as a rack mounted device and comprises one or more Application Specific Integrated Circuits (ASICs) and boards with components mounted thereon. Further details of elements of IO device 100 are provided below with reference to FIG. 2.

Figure 2:
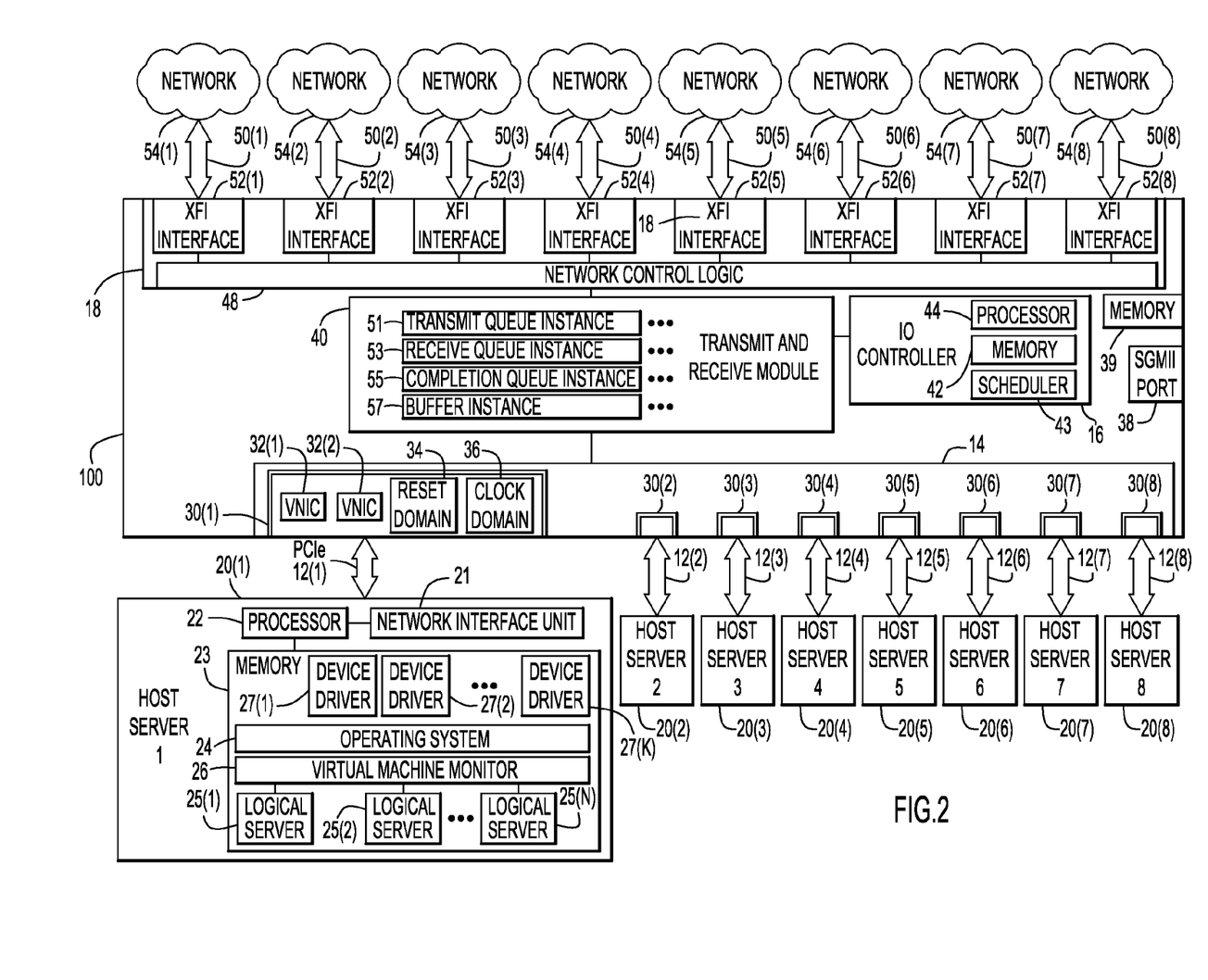
FIG. 2 is detailed block diagram of one example of the IO device configured to connect multiple serves to one or more network interfaces.

FIG. 2 is a detailed block diagram of one form of IO device 100 of FIG. 1. As noted above, IO device 100 connects a plurality of host servers to one or more networks. FIG. 2 illustrates an example arrangement in which device 100 is configured to connect eight host servers 20(1)-20(8) to any one or more of eight networks 54(1) to 54(8).

Device 100 includes a network connection module 18 comprising network control logic 48 and eight network interfaces 52(1)-52(8) each providing a corresponding communication link 50(1)-50(8). In one form, network interfaces are 10 Gigabit Serial Electrical Interfaces (XFI interfaces). These interfaces support 10 Gigabit Ethernet (GE) port channel, or 40 GE when bundled into groups of four interfaces. Each interface 52(1)-52(8) may also support Serial Gigabit Media Independent Interface (SGMII) transfer at 1 GE speed. The number of interfaces and communication links may depend on, for example, the number of host servers 20, selected configurations, networks used, etc. Additionally, the networks 54(1)-54(8) may be the same or different networks, again depending on the configurations selected by host servers 20.

Device 100 may also include a separate SGMII port 38 configured to connect to Baseboard Management Controller (BMC) interfaces of respective host servers 20(1)-20(8). Port 38 may also support Network Controller Sideband Interface (NCSI) transfer. Additionally, device 100 may include memory 39 in the form of double data rate type three synchronous dynamic random access memory (DDR3 SDRAM) having a high bandwidth interface (e.g., 4 GB max capacity) that may be used for, as an example, burst packet buffering, management protocols, PCIe configuration and virtualization structures, exchange table management, flow tables, and other control structures. Device 100 may also include other interfaces, such as a 16-bit parallel flash interface, a Serial Peripheral Interface (SPI), two wire ($I^2C$) interface, universal asynchronous receiver/transmitter (UART), Management Data IO (MDIO) interface, General Purpose IO interface (GPIO), and/or Joint Test Action Group (JTAG) interface. Such interfaces are options for different forms of device 100, and, for ease of illustration, have not been included in FIG. 2.

IO device 100 may operate with host servers 20(1)-20(8) having a number of different configurations. FIG. 2 illustrates one example implementation of server 20(1) in which it comprises a network interface unit 21, a processor 22 and a memory 23. In memory 23, software instructions are stored for a variety of functions performed by the host server 20(1). For example, instructions are stored in memory 23 for an operating system (OS) 24, a plurality of virtual machine processes (logical servers) 25(1)-25(N), a virtual machine monitor 26, and device drivers 27(1)-27(K). The virtual machine monitor 26 allocates computing resources of the processor 22 and working memory to the virtual machine processes 25(1)-25(N). The device drivers 27(1)-27(K) are software drivers that enable the host server 20 to operate with peripheral devices, including IO device 100. For example, device driver 27(1) is associated with one or more virtual network interface cards (vNICs), device driver 27(2) is associated with one or more other vNICs, etc. While FIG. 2 shows that the host server 20(1) executes virtual machine processes, this is only an example, and more generally, the host server 20(1) may execute processes that are not necessarily virtualized.

For ease of illustration, the implementation details of the remaining seven host servers 20(2)-20(8) have been omitted. However, it would be appreciated that host servers 20(2)-20(8) may be the same as described above with reference to server 20(1) or may have a different implementation.

The communication links 12(1)-12(8) between host servers 20(1)-20(8) and device 100 are enabled according to the Peripheral Component Interconnect Express (PCIe) standard that is virtualized at virtual host interface 14. At the physical level, a PCIe link comprises one or more lanes. Each lane is composed of transmit and receive pairs of differential lines. As such, each lane is composed of 4 wires or signal paths, configured to transport data packets between endpoints of the link. A link may include one to thirty-two lanes, in powers of two (2, 4, 8, 16 and 32). In the arrangement of FIG. 2, device 100 includes 32 PCIe lanes that terminate at a receptacle for connection to PCIe plugs of host servers 20(1)-20(8).

In the arrangement of FIG. 2, the 32 PCIe lanes are configurable to implement the number and types of links required to communicate with the number of attached host servers. The configurable implementations include 4×8 (facilitating 64 Gb/s transfer rate per host server), 8×4 (facilitating 32 Gb/s per host server), or 16×2 (facilitating 16 Gb/s per host server). Device 100 supports PCIe Gen3, Gen2, or Gen1 as well as heterogeneous host server interface combinations.

As noted above, in the arrangement of FIG. 2, device 100 connects to eight host servers 20(1)-20(8) via eight PCIe links 12(1)-12(8), respectively. For each PCIe link 12(1)-12(8), virtual host interface 14 enables a corresponding virtual PCIe port 30(1)-30(8). For ease of illustration, only the details of port 30(1) are shown in FIG. 2.

Virtual host interface 14 includes a number of vNICS 32(1), 32(2), etc. As described below, each vNIC is independently allocated to one of the PCIe ports 30(1)-30(8), and thus to one of the host servers 20(1)-20(8), by an IO controller 16 of IO device 100. Each port 30(1)-30(8) may include a plurality of vNICs but, for ease of illustration, only two vNICs, vNICs 32(1) and 32(2), are shown in port 30(1). Additionally, each virtual port 30(1)-30(8) includes its own clock domain 36 that is driven by a clock associated with that port, and thus is independent from the system clock of device 100. Additionally, each port 30(1)-30(8) has its own reset domain 34 that is isolated from the reset domains of other ports 30(2)-30(8) and from the central reset domain of device 100. This clock and reset isolation is represented in FIG. 2 by the two lines surrounding each port 30(1)-30(8).

Each server 20(1)-20(8) is connected to one or more network interfaces 52(1)-52(8) in network connection module 18 such that data received by device 100 from one of the host servers 20(1)-20(8) is passed through to the interfaces. In addition to virtual host interface 14, device 100 includes a number of other hardware and software elements that facilitate the connection of servers 20 to interfaces 52. These elements are collectively shown in FIG. 2 as transmit and receive module 40. Transmit and receive module 40 comprises multiple instances of transmit and receive resources each configured to assist in the passing of data between host servers 20(1)-20(8) and network connection module 18. The transmit and receive resources instances may include, but are not limited to, transmit queue instances 51, receive queue instances 53, completion queue instances 55, buffer instances 57, etc. A large number of other resource instances, such as interrupt controllers or storage controllers, may also be implemented in module 40, but have been omitted for ease of illustration. As described below, these resource instances are mappable to the vNICs of device 100.

The IO controller 16 comprises a processor 44, a scheduler 43, and memory 42 that stores software executable by the processor 44 for performing various control functions in the IO device 100. Scheduler 43 is a dedicated piece of hardware that is configured by processor 44.

When a host server 20 connects to device 100, it observes a private IO subsystem (private PCIe tree with multiple vNICs) that it interprets as being configurable to its own specifications. That is, when connected, each host server 20(1)-20(8) is not aware that it is sharing a common device with the other host servers, and the host server is permitted to determine what connections it desires with one or more interfaces 52(1)-52(8). This virtualization layer allows IO device 100 to present heterogeneous vNIC configurations and addressing to each of the host servers 20(1)-20(8) as required by each host server's Basic IO System (BIOS). As such, IO controller 16 receives host-selected configuration data, referred to as PCIe transactions, from each host server 20(1)-20(8). IO controller 16 responds to the PCIe transactions as needed, and uses the transactions to configure the virtual PCIe topology or space for a given one of the host servers 20(1)-20(8).

Because the configurations selected by each host server 20(1)-20(8) do not account for the requested configurations of the other servers, there may be colliding information (e.g., addresses). Instead of notifying host servers 20(1)-20(8) of such collisions, as processor 44 builds the virtual PCIe topology for a given host server it also maps the topology to the transmit and receive resource instances of transmit and receive module 40. For example, in one form a base address register (BAR) describes the address of a transmit and receive resource instance with respect to the private PCIe topology of host server 20(1). However, because this address is private to host server 20(1), processor 44 maps or correlates the BAR address to an address that identifies the transmit and receive resource instance uniquely. This ensures that each transmit and receive resource instance is mapped to the host server 20(1), and that there is no overlap of the instance with other host servers 20(2)-20(8). Once completed, the mapped configuration is maintained by the transmit and receive resource instances thereby allowing the virtual devices to operate at full speed.

The above PCIe topology generation and associated mapping is performed for all host servers 20(1)-20(8) connected to device 100. Furthermore, in operation, host servers 20(1)-20(8) are prevented from addressing transmit and receive resource instances that have not been mapped to them. Additionally, because IO device 100 maintains one to one mapping of instances to servers, resource instances mapped to a particular host server may not access memory or other resources associated with other hosts servers.

The integration of IO operations into a single device provides advantages in scheduling. In one form, host servers 20(1)-20(8) will compete for limited resources, such as bandwidth. However, because IO device 100 is a central location for all IO transactions, the device can schedule bandwidth between host servers 20(1)-20(8). As such, the scheduler 43 enforces service levels according to configured policies. The scheduler 43 has visibility across all vNICs and queues in the system, allowing priority groups, rate limiting, and CIR (Committed Information Rate) to be scheduled across vNICs as well as across host servers 20(1)-20(8). Therefore, host servers 20(1)-20(8) and resources may be parceled out according to any preselected policy, allowing for "universal" scheduling. This traffic scheduling may be performed for egress or ingress data traffic.

Large bursts of Ethernet traffic targeting a single host server 20 is an area of concern. As noted below, in one form, device 100 includes the ability to buffer some level of Ethernet traffic. However, due to the virtual topology created within device 100, any single or group of virtual PCIe devices can utilize the full uplink bandwidth, can be rate limited to a target bandwidth, or can share bandwidth according to a policy.

As previously noted, each virtual port 30(1)-30(8) includes its own clock domain 36 that is independent from the system clock of device 100. Each virtual port 30(1)-30(8) also includes its own reset domain 34 that is isolated from the reset domains of other ports and from the central reset domain of device 100. Due to these private clock and reset domains, the vNICs 32(1)-32(N) for each of the links 12(1)-12(8) are isolated from one another and, as such, the links and host servers 20(1)-20(8) are operationally isolated and independent from one another. This isolation ensures that the operation of one host server does not affect the operation of other host servers. That is, a host server may reboot, enumerate PCIe, power cycle, or be removed from device 100 at any time without disturbing the operation of other attached host servers. A surprise hot plug event, for example, will terminate any pending transaction to that host server with error response completions back to resources of IO device 100. All internal direct memory access (DMA) engines track error state on a per-queue and per-vNIC basis, so individual vNICs assigned to removed host servers will experience fatal error conditions and report them, while other vNICs operate continuously without error.

In summary, because each host server has its own PCIe tree and no knowledge of other host servers, each host server can select its own desired transmit/receive configuration (private interrupt mapping and assignment space and private ownership of its own devices). In other words, the host server boots, configures and uses its devices, and there is no change to the host server control model and no change in the drivers. Therefore, there is no need for extensions such as Multi-Root IO Virtualization (MR-IOV) or Single-Root IO Virtualization (SR-IOV), although support for SR-IOV may be provided. Additionally, each host server cannot disturb its peers, either maliciously or accidently. Host servers can be removed or rebooted at any time without affecting one another, and can re-enumerate their PCIe topology at any time.

Figure 3:
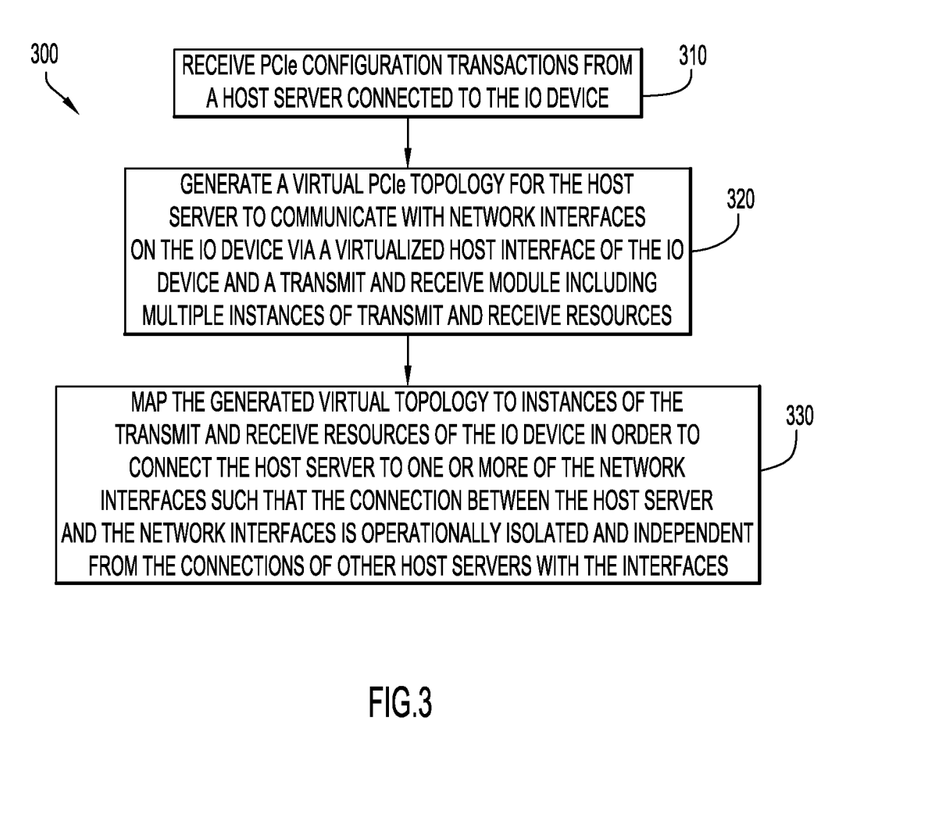
FIG. 3 is a flowchart of an example method implemented in the IO device configured to connect multiple serves to one or more network interfaces.

FIG. 3 is a flowchart of an example method 300 implemented in one form of IO device 100 to boot one or more host servers 20 connected to a virtual PCIe port 30 of device 100. For ease of reference, FIG. 3 will be described with specific reference to host server 20(1) of FIG. 2.

After host server 20(1) is reset or turned on, the server's BIOS or OS probes its attached PCIe bus via PCIe configuration transactions that define the PCIe topology desired by server 20(1). Method 300 begins at 310 wherein the PCIe configuration transactions are received from host server 20(1). More specifically, the transactions are received by processor 44 in IO controller 16. Processor 44 responds to the configurations transactions, as needed, and maintains a database of the desired PCIe topology and device type associated with server 20(1). This database also includes the desired PCIe topologies of the other servers 20(2)-20(8) and their device types.

Method 300 continues at 320 where processor 44 generates a virtual PCIe topology for host server 20(1) to communicate with network interfaces 52(1)-52(8). Connection between host server 20(1) and network interfaces 52(1)-52(8) is provided via virtualized host interface 14 and transmit and receive module 40. As previously noted, transmit and receive module 40 includes multiple instances of transmit and receive resources. At 330, processor 44 maps the generated virtual topology to instances of the transmit and receive resources. The connections between host server 20(1) and network interfaces 52(1)-52(8) are operationally isolated and independent from the connections of other servers 20(2)-20(8). As noted above, in one form processor 44 ensures each transmit and receive resource instance is mapped to the host server 20(1), and that there is no overlap of the instances with other host servers. Once completed, the mapped configuration is maintained by the transmit and receive resource instances.

As noted above, due to the independence and isolation of the host servers 20(1)-20(8) and the paths to interfaces 52(1)-52(8), powering off or sudden reset of an individual server does not impact the operation of other servers attached to device 100. If a server 20, such as server 20(1), is powered off or reset suddenly, processor 44 clears the mapping performed above at 64 and frees the resources associated with the server. When server 20(1) is powered on, operations 310-330 may be repeated.

Figure 4:
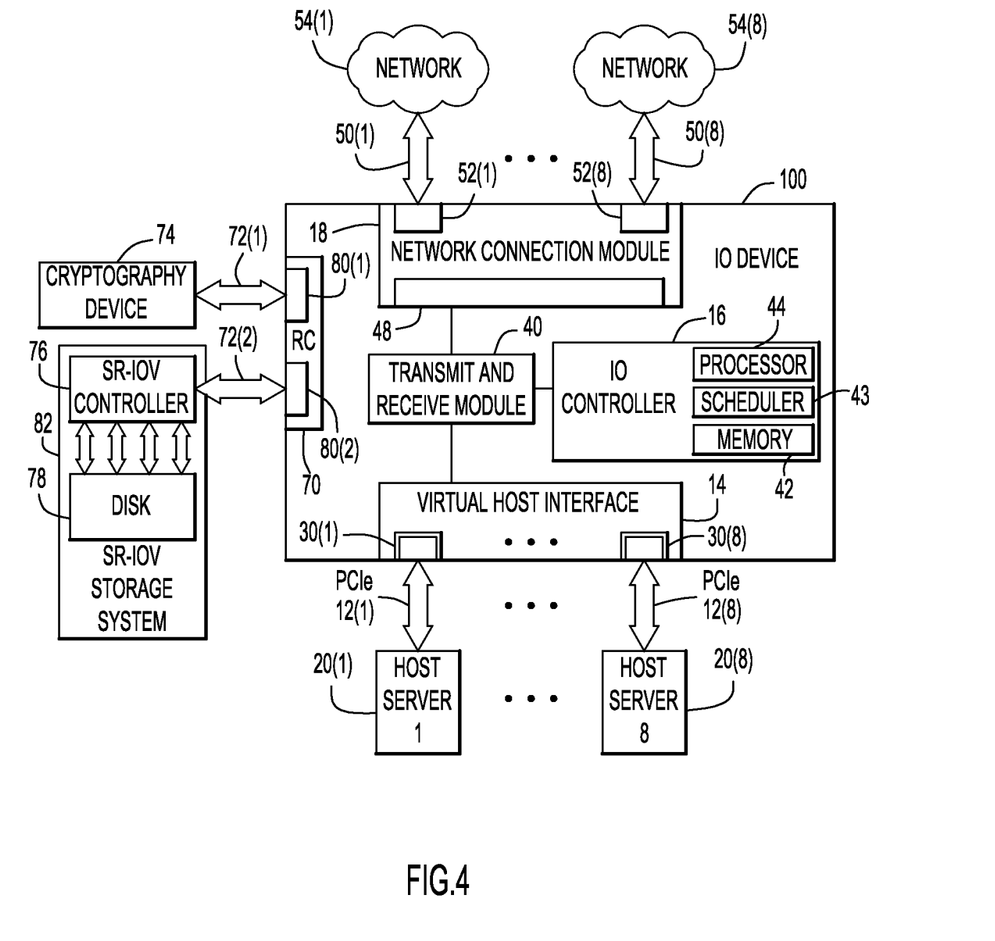
FIG. 4 is detailed block diagram of another example of the IO device configured to connect multiple serves to one or more network interfaces.

FIG. 4 is block diagram illustrating another form of IO device 100. Device 100 illustrated in FIG. 4 includes all of the above elements of device 100 of FIG. 2, but also includes additional elements in the form of a PCIe root complex (RC) 70. In a PCIe system, a RC connects the processor and memory to one or more switch devices in a PCI Express switch fabric. Similar to a host bridge in a PCI system, the RC generates transaction requests on behalf of the processor, which is interconnected through a local bus. RC functionality may be implemented as a discrete device, or may be integrated with the device processor. A RC may contain more than one PCI Express port and multiple switch devices can be connected to ports on the RC or cascaded.

Returning to FIG. 4, RC 70 supports eight lanes of PCIe Gen3 that may be configured into one x8 PCIe port, or into two x4 PCIe ports. FIG. 4 illustrates an example in which RC 70 is configured into two x4 PCIe ports 80(1) and 80(2), thereby supporting communication links 72 with two PCIe devices.

RC 70 allows one or more physical PCIe device to be attached to device 100. The attached PCIe device may be controlled by processors, such as processor 44, in 10 device 100. That is, device 100 controls the PCIe endpoint devices attached to RC 70, thereby allowing device 100 to run the physical driver of, for example, SR-IOV devices. This control further allows mapping of each function of that device to individual hosts, which in turn run the native driver of the mapped function. This allows third party PCIe devices to be integrated with other virtual devices in a way that does not need to be exposed to host servers 20(1)-20(8). Example implementations of RC 70 are provided below.

Each RC port 80(1) and 80(2) has a private PCIe space enumerated by processor drivers and is assigned local BARs by processor 44. In one form, processor 44 may maintain total control over its local devices running its own Linux drivers. For example, in FIG. 4, PCIe port 80(1) is attached to a cryptography device 74. In this arrangement, IO device 100 enables policies to be attached to individual Ethernet vNICs, while ensuring that host servers observe only regular vNICs and drivers. More specifically, IO device 100 is configured to route packets through cryptography device 74 and manage the keys according to network policies, but host servers do not see a different interface.

In another form, processor 44 may map partial or entire functions or devices to the attached host servers 20(1)-20(8). This is especially useful for SR-IOV capable devices, which often support 16 functions plus a physical device driver. An example of one SR-IOV device in the form of an SR-IOV storage system 82 is shown attached to port PCIe 80(2) of FIG. 4. SR-IOV storage system 82 includes a controller 76 that is configured to interface and communicate with port 80(2), and with disk storage 78. In this arrangement, IO device 100 allows all host servers 20(1)-20(8) to access and share SR-IOV storage system 82 without knowledge by any of the servers that they are also sharing the system.

When SR-IOV storage system 82 is attached, processor 44 will run the physical system driver locally and will map individual functions to individual host servers 20(1)-20(8). Because device 100 has virtualized the PCIe topology, device 100 can translate IO operations between topologies without support from the device drivers. As such, the functions of system 82 may be separated and the individual functions may be added to one or more PCIe server topologies.

Device 100 will maintain the address and configuration space mapping such that each attached host server 20(1)-20(8) sees only the function(s) mapped to its local PCIe topology. Host servers 20(1)-20(8) will enumerate the mapped function using its BIOS and assign BARS in its local PCIe address space. This allows host servers 20(1)-20(8) to run the native function driver, completely isolated from its neighboring host servers.

An individual host server may reboot and re-enumerate its virtual PCIe topology without disturbing operation of other attached host servers. In this event, the processor 44 will issue a function reset to the mapped functions from storage system 82. Logic within RC 70 includes a table that maps PCIe Bidirectional Forwarding Detection (BDF) numbers to internal vNICs of device 100, which are in turn assigned to host virtual switch BDFs as transactions travel upstream.

In another form, the local memory resources of device 100 can also be used as a resource to virtualize standard devices. In these cases, processor 44 handles the driver translation tasks. More specifically, an attached PCIe device may not be a sharable device. In this case, processor 44 may take control of the physical device and function as a proxy between the physical PCIe device and a host server. After processor 44 takes control of the PCIe device, the processor 44 gives functions to a host server. When a device request is made by a host server 20(1)-20(8), the requests are proxied through processor 44. In this way, a layer of control software, similar to a hypervisor, is utilized. The proxy process ensures host servers 20(1)-20(8) will not collide when requesting physical device services. Therefore, if an attached PCIe device is not sharable, the processor functions as proxy for its functions between the device and a host server 20(1)-20(8) that uses the functions.

As previously noted, FIG. 4 illustrates an example in which cryptography device 74 and SR-IOV storage system 82 are attached to RC 70. It should be understood that these two devices/systems are merely examples. A number of other types of PCIe enabled devices may be attached to RC 70, and cryptography device 74 and SR-IOV storage system 82 may be used separately and in different configurations.

Figure 5:
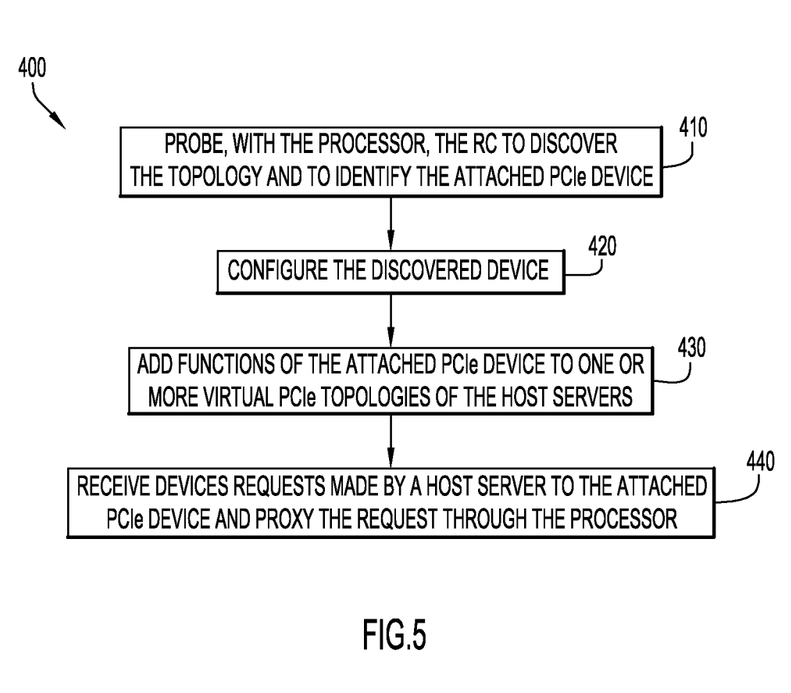
FIG. 5 is a flowchart of an example method implemented in the IO device configured to connect multiple serves to one or more network interfaces.

FIG. 5 is a flowchart of a method 400 implemented in device 100 of FIG. 4 for virtualizing a physical PCIe device connected to RC 70. Method 400 begins at 410 where processor 44 probes RC 70 to discover the topology and to identify the attached PCIe device. At 420 the discovered device is configured for control by processor 44. At 430, desired functions of the discovered device are added to one or more virtual PCIe topologies of host servers 20(1)-20(8). At 440, device requests made by a host server 20(1)-20(8) to the attached PCIe device are received. The device requests are proxied through processor 44. In one form, when the attached PCIe device completes a transaction in response to a request from a host server 20(1)-20(8), processor 44 notifies the appropriate host server via its virtual host interface 14.

As noted throughout the above description, the various forms of IO device 100 provide a number of features and advantages. For example, in one form, IO device 100 may support multiple independent host servers, greatly reducing the cost and power of a server cluster. This server aggregation architecture reduces network latency, allows each individual server to burst data at the full cluster uplink bandwidth, can absorb large bursts to a single host, and provides all servers with centralized management and network services not available from traditional network interface cards, thereby allowing consolidated policies to be applied across groups or classes of devices. Additionally, each host server interface is fully virtualized and isolated from the interfaces of other host servers and, accordingly, supports hot plug. In another form, failover operations between two virtual or real devices connected to one or two IO devices are provided. This is possible because IO device 100 has completely virtualized the PCIe topology and can take over or re-direct device interface commands and responses from a host server at any time.

Aspects of device 100 have been described with reference to a single processor 44. It would be appreciated that the use of one processor is merely illustrative, and more than one processor may be used for any of the above operations. For example, in one form, device 100 includes five identical or different processors.

The above description is intended by way of example only.

What is claimed is:

1. An apparatus comprising:
a network connection module comprising one or more network interfaces;
a virtual host interface configured to communicate with a plurality of host servers;
a transmit and receive module comprising multiple instances of transmit and receive resources configured to pass data from the virtual host interface to the network connection module; and
an input/output (IO) controller configured to connect each of the host servers to at least one of the network interfaces such that the connections between each host server and corresponding one or more network interfaces are operationally isolated and independent from connections between other host servers and their corresponding network interfaces,
wherein the IO controller includes a processor to receive Peripheral Component Interconnect Express (PCIe) configuration transactions from a particular host server, build a virtual topology for the particular host server, and map the virtual topology to instances of the transmit and receive resources.

2. The apparatus of claim 1, wherein the virtual host interface comprises a plurality of lanes configured to comply with the PCIE standard that may be used in multiple PCIe arrangements to support different numbers of lanes per host server.

3. The apparatus of claim 2, wherein the IO controller comprises a processor that is configured to allocate a subset of the plurality of lanes as a single PCIe interface or as multiple PCIe interfaces.

4. The apparatus of claim 2, wherein the IO controller is configured to virtualize one or more virtual PCIe ports that each include a clock domain.

5. The apparatus of claim 2, wherein the IO controller is configured to virtualize one or more virtual PCIe ports that each include a reset domain configured to be independently asserted so as not to interfere with the operation of any other virtual PCIe ports.

6. The apparatus of claim 1, wherein the instances of the transmit and receive resources that are mapped to the virtual topology are configured to maintain a mapping to the virtual topology.

7. The apparatus of claim 1, wherein the processor is configured to manage access by the host servers to network bandwidth.

8. The apparatus of claim 1, wherein the processor is configured to allow a host server to at least temporarily transmit data using all of the network interfaces.

9. The apparatus of claim 1, wherein the IO controller is configured to connect a host server to one or more of the network interfaces using configuration transactions received from the host server.

10. The apparatus of claim 2, further comprising:
a PCIe root complex configured to support a plurality of lanes configured to comply with the PCIe standard and for use in multiple PCIe arrangements to support different numbers of lanes per host server, wherein the lanes supported by the PCIe RC are separate from the virtual host interface.

11. The apparatus of claim 10, further comprising:
a processor configured to allocate a subset of the plurality of lanes supported by the PCIe root complex as a single PCIe interface or as multiple PCIe interfaces.

12. A method comprising:
receiving, at an input/output (IO) device, Peripheral Component Interconnect Express (PCIe) configuration transactions from each of a plurality of host servers connected to the IO device;
generating a virtual topology including a virtual host interface for each of the host servers, wherein each virtual host interface connects one of the host servers to a transmit and receive module in the I/O device that includes multiple instances of transmit and receive resources; and
mapping the virtual topology generated for each of the host servers to instances of the transmit and receive resources in order to connect each of the host servers to at least one network interface on the IO device such that the connections between each host server and corresponding one or more network interfaces are operationally isolated and independent from connections between other host servers and their corresponding network interfaces.

13. The method of claim 12, wherein the configuration transactions are Peripheral Component Interconnect Express (PCIe) configuration transactions.

14. The method of claim 12, wherein mapping the virtual topology generated for each of the host servers to instances of the transmit and receive resources comprises:
mapping an instance of the transmit and receive resources to a single virtual topology.

15. The method of claim 12, and further comprising:
allocating utilization of an available bandwidth according to one or more predetermined policies.

16. The method of claim 12, wherein after removal of a host server from the IO device by disconnection or a power off event, further comprising:
clearing the mapping of the virtual topology associated with a removed host server.

17. The method of claim 12, wherein the IO device includes a processor and a PCIe root complex supporting a plurality of lanes configured to communicate with an attached PCIe device using the PCIe standard, and further comprising:
probing, with the processor, the root complex to discover the topology of the attached PCIe device and to identify the attached PCIe device;
configuring the attached PCIe device for control by the processor; and
adding functions of the attached PCIe device to a virtual topology of a host server.

18. The method of claim 17, further comprising:
receiving requests made by a host server to the attached PCIe device; and
proxying the requests through the processor.

19. An apparatus comprising:
a plurality of network interfaces;
a virtual host interface configured to communicate with a plurality of host servers, wherein the virtual host interface comprises a plurality of lanes configured to comply with the Peripheral Component Interconnect Express (PCIe) standard for use in multiple PCIe arrangements to support different numbers of lanes per host server;
a transmit and receive module comprising multiple instances of transmit and receive resources configured to pass data from the virtual host interface to plurality of network interfaces; and
an input/output (IO) controller configured to connect each of the host servers to at least one network interface such that the connections between each host server and corresponding one or more network interfaces are operationally isolated and independent from connections between other host servers and their corresponding network interfaces,
wherein the IO controller includes a processor to receive PCIe configuration transactions from a particular host server, build a virtual PCIe topology for the particular host server, and map the virtual topology to instances of the transmit and receive resources.

20. The apparatus of claim 19, wherein the IO controller comprises a processor that is configured to allocate a subset of the plurality of lanes as a single PCIe interface or as multiple PCIe interfaces.

21. The apparatus of claim 19, wherein the IO controller is configured to virtualize one or more virtual PCIe ports that each include a clock domain.

* * * * *